(12) United States Patent
Lind

(10) Patent No.: US 6,318,937 B1
(45) Date of Patent: Nov. 20, 2001

(54) ARRANGEMENT RELATING TO HIGH-SPEED TOOLS

(75) Inventor: Björn Lind, Billdal (SE)

(73) Assignee: Bjorn Lind Finance & Property, Gothenburg (SE)

( * ) Notice: Subject to any disclaimer, the term of this patent is extended or adjusted under 35 U.S.C. 154(b) by 0 days.

(21) Appl. No.: 09/254,478

(22) PCT Filed: Aug. 20, 1997

(86) PCT No.: PCT/SE97/01441

§ 371 Date: Nov. 16, 1999

§ 102(e) Date: Nov. 16, 1999

(87) PCT Pub. No.: WO98/09762

PCT Pub. Date: Mar. 12, 1998

(30) Foreign Application Priority Data

Aug. 28, 1997 (SE) .................................................. 9603247

(51) Int. Cl.[7] ......................................................... B23C 1/06
(52) U.S. Cl. ............................ 409/231; 408/97; 408/226; 409/136

(58) Field of Search ................................. 408/56, 61, 97, 408/226; 409/230, 231, 232, 233, 136; 407/53, 54

(56) References Cited

U.S. PATENT DOCUMENTS

| 2,404,149 | * | 7/1946 | Trinkle ................................. 409/136 |
| 3,371,560 | * | 3/1968 | Kaser ..................................... 408/97 |
| 3,874,808 | | 4/1975 | Zaccardelli et al. . |
| 4,027,992 | * | 6/1977 | Mackey, Sr. et al. ................ 408/97 |
| 4,718,798 | * | 1/1988 | Dumargue et al. ................. 409/231 |
| 5,049,013 | * | 9/1991 | Engles et al. ....................... 409/231 |
| 5,743,683 | * | 4/1998 | Skaggs ................................... 408/97 |

* cited by examiner

*Primary Examiner*—Daniel W. Howell
(74) *Attorney, Agent, or Firm*—Pillsbury Winthrop LLP

(57) ABSTRACT

A tool for milling and drilling where the rotating tool has a bearing surface provided to cooperate with another bearing surface to take up radial cutting forces. The two surfaces are mutually separated by a fluid and are essentially axially non-slidable when the cutting tool is engaging the workpiece.

20 Claims, 3 Drawing Sheets

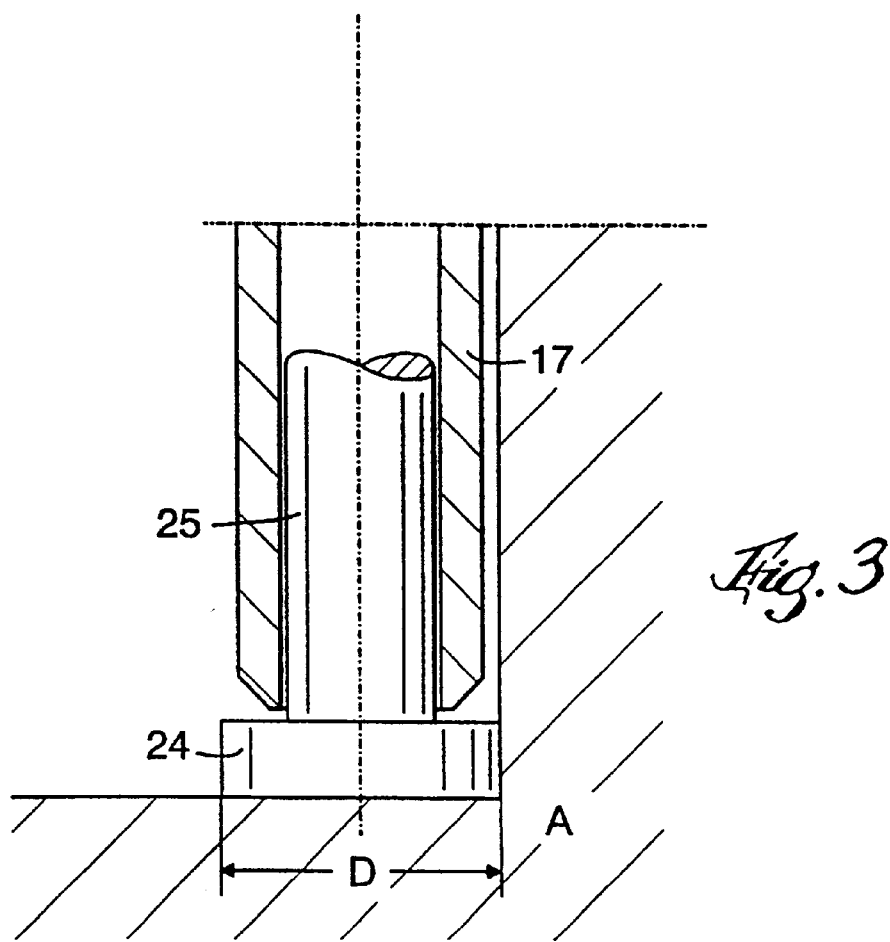
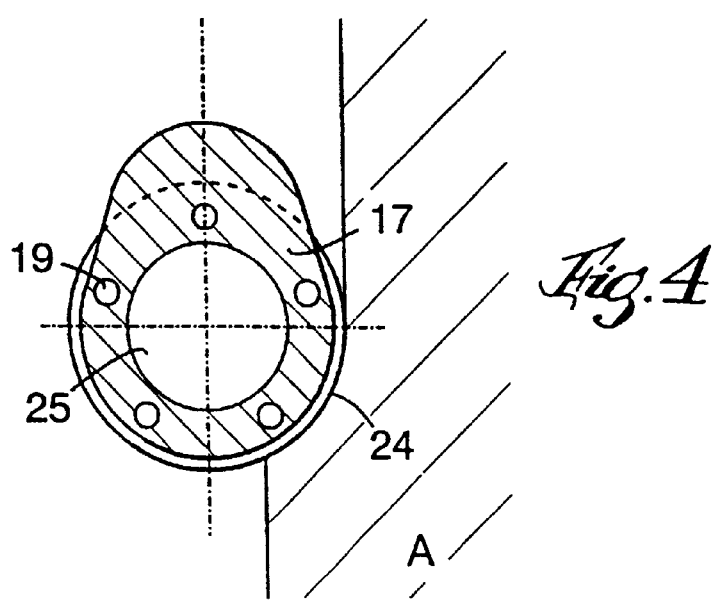

ARRANGEMENT RELATING TO HIGH-SPEED TOOLS

The present invention relates to a unit that includes a high-speed cutting tool, such as a milling tool or drilling tool.

The inventive tool forms part of a system, and the invention and the system components will therefore be described separately.

It is known that high cutting speeds provide a better result with regard to surface structure and tolerances than low cutting speeds. High cutting speeds normally result in faster removal of material from the workpiece, i.e. in a greater machining capacity.

Milling of lightweight metal parts in the aircraft industry to reduce their weight is one practical example in this respect. In this regard, it may be desired to leave material between the milled or machined part so as to form stiffening ribs or flanges. Besides being relatively time-consuming, it is not possible to form ribs of desirable thinness with the aid of present-day milling equipment. Circuit board machining operations are another practical example in this regard. The circuit boards are normally machined with the aid of so-called spiral drills which after having penetrated through the fibre board are moved in the plane of the board so as to form a groove therein.

Milling tools and the drilling tools are both subjected to bending stresses and axially acting forces in operation (due to the inclination of the milling tool and the drill bit). The tool is thus subjected to forces which, if the forces are constant and the rotary speed increased, will increase the machining power of the tool spindle. A tool spindle that rotates at 1,000 r.p.m. and a power of 10 kW generates the same tool cutting forces as a tool spindle that rotates at 100,000 r.p.m. with a machining power of 100 kW. However, a technical problem resides in the ability to take-up theses forces in bearings and journals at said high tool speeds. At present, the technical limit with respect to a typical tool spindle bearing comprised of hybrid ball bearings (steel rings and ceramic balls) is about 50,000 r.p.m. and 50 kW, wherewith a further problem resides in managing the critical speeds generated by the system.

The present invention, as defined in the characterizing clauses of respective claims, enables the tool to operate at speeds above 100,000 r.p.m. and at a power of 100 kW with very great precision and with rapid machining of the workpiece.

The invention will now be described in more detail with reference to an exemplifying embodiment thereof and also with reference to the accompanying drawings, in which FIG. 1 is a schematic sectional view of the inventive arrangement;

FIGS. 3 and 4 are schematic sectional views of examples of an alternative embodiment of the invention.

DRIVE UNIT

Figure 1:
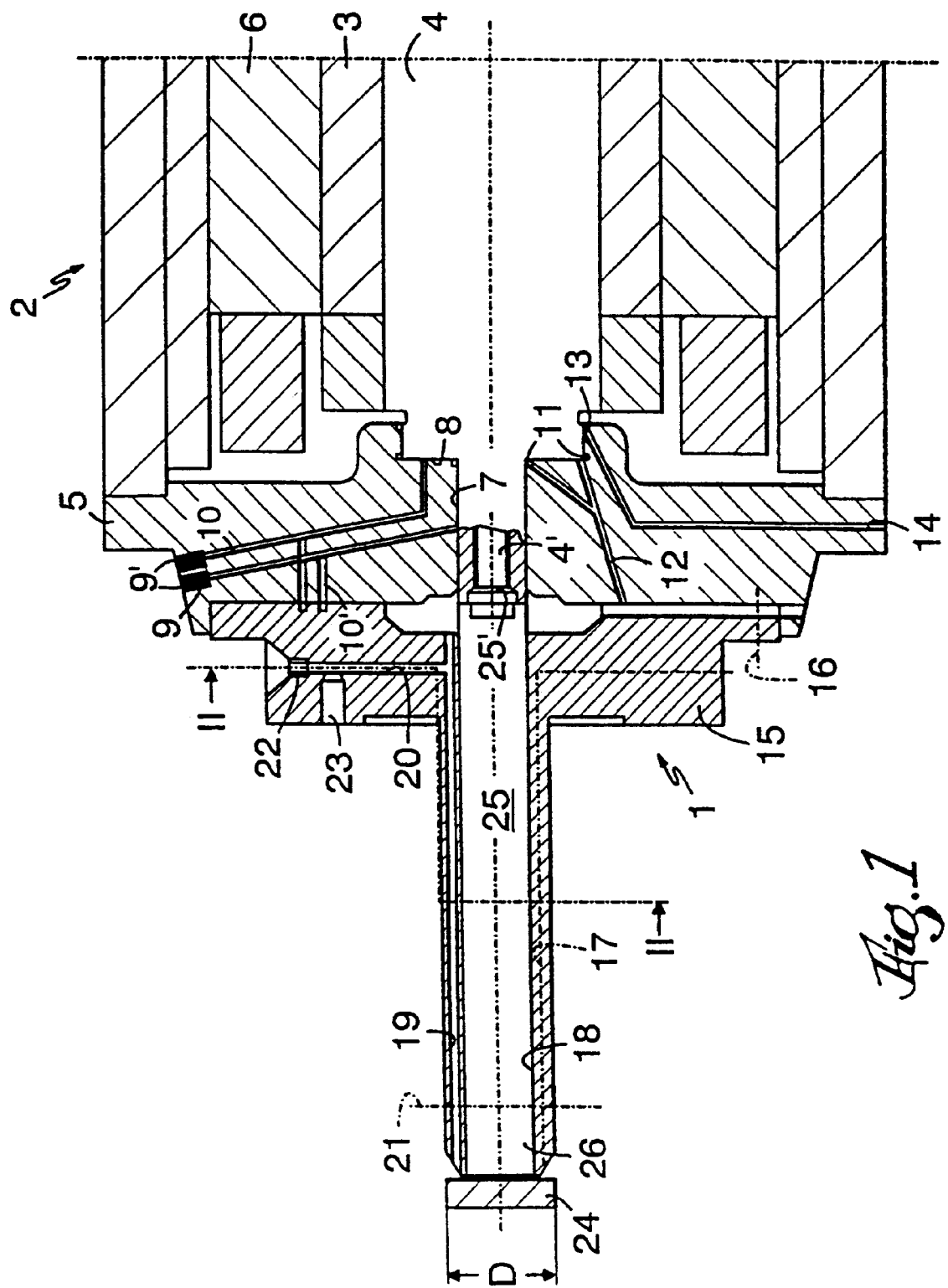

The inventive arrangement includes a tool 25 which is accommodated in an adapter 1 which, in turn, is connected to a drive unit 2. In the illustrated case, the drive unit 2 is an electric motor whose rotor 3 is carried by a tool spindle 4 that is mounted in bearings in two end-walls 5 of the motor (front and back end shield bearings), of which only one is shown. The reference numeral 6 identifies the stator and its windings. The spindle 4 is mounted in respective end-walls 5 in a radial bearing 7 and a thrust bearing 8, which are lubricated with a liquid lubricant, which may be water. The lubricant is injected under pressure into the radial bearing 7 and the thrust bearing 8 through respective passageways 9 and 10 disposed radially around the end-wall 5. The lubricant delivery passageways 9, 10 are provided at their respective inlets with a constriction in the form of a nipple 91, which functions to generate the desired pressure and lubricant flow in the lubricating passageways 9, 10. The nipple 9' is exchangeable, so as to enable the desired pressure and flow to be obtained in the bearings, the function of said bearings being dependent partly on the dynamic effect generated by rotation of the spindle, and partly by the pressure of the fluid delivered to the bearings. As schematically indicated at 10', a pressure sensor may be connected to respective passageways 9, 10. Ring-shaped drainage grooves 11 are provided in the end-wall 5 at the junction between the radial bearing 7 and the thrust bearing 8 and also at the periphery of said thrust bearing, said drainage grooves communicating with the outside of the end-wall 5, via a drainage passageway 12, where drained lubricant can be collected. In order to ensure that lubricant will not penetrate inwardly of the end-wall 5, the end-wall is provided with a ring-shaped groove 13 which communicates with gas under pressure, e.g. compressed air, via a conduit 14. Any lubricant that may leak inwardly is thereby forced back to the nearest drainage groove 11. The other end-wall (not shown) of the drive unit 2 is provided with a corresponding arrangement.

Although in the aforedescribed example, the spindle 4 of the drive unit is driven by an electric motor it will be understood that other rotary and torque-generating machines may be used, such as air turbines or fluid turbines or any other drive source appropriate in the present context.

The aforesaid bearings are radial bearings and thrust bearings that comprise two surfaces which are mutually separated by a fluid. It will be understood that the described spindle bearings are merely examples of possible bearings and that the spindle 4 of the drive unit may be mounted in other type of bearing, e.g. a ball bearing, roller bearing, air bearing or magnetic bearing.

Adapter

The adapter 1 is comprised of a base part 15 which has the form of a plate (FIG. 1) fastened to the end-wall 5 with the aid of screws for instance (indicated at 16). Formed integrally with the base part 15 is a supportive part 17 in the form of a sleeve whose bore coincides coaxially with the spindle 4 when the adapter 1 is mounted in position. Mounted on the inside of the free end of the sleeve 17 is a bearing 18, in the illustrated case a radial bearing whose diameter is slightly smaller than the inner diameter of the sleeve. A plurality of lubricant passageways 19 are disposed parallel with the axis of the supportive part 17 (said passageways being five in number in the illustrated case; see FIG. 2). The passageways 19 communicate with respective delivery passageways 20 disposed radially around the base part 15 and functioning to deliver lubricant to the bearing 18, through holes 21 provided in the outer end of respective passageways 19. The inlets of respective delivery passageways 20 are provided with a constriction in the form of a nipple 22, which functions to generate the pressure and flow desired in the lubricant passageway 19. The nipple 22 is exchangeable so as to enable the desired pressure and flow to be easily obtained, by fitting an appropriate nipple. It will be understood that the delivery passageways 20 are connected to a lubricant source under pressure, wherein the function of the bearings is dependent partly on the dynamic effect generated as the tool rotates, and partly by the pressure of the delivered fluid. The lubricant may be water, for instance. A pressure sensor may be connected to respective passageways 20, as indicated at 23.

Figure 2:
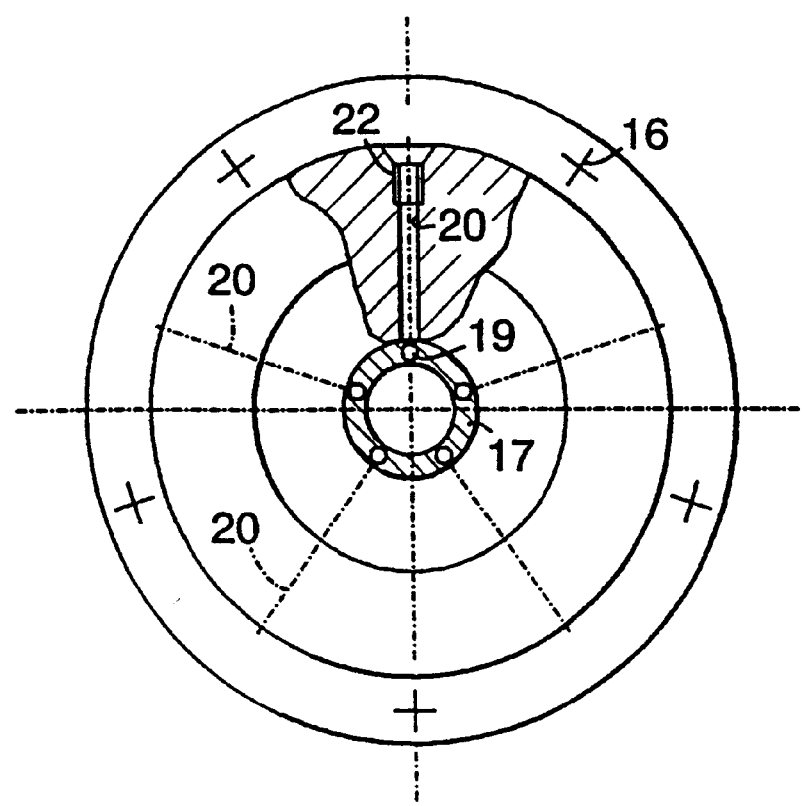
FIG. 2 is a sectional view taken on the line II—II in FIG. 1.

The bearing surface 18 intended for coaction with the bearing surface 26 of the inventive tool, which will be described hereinafter, forms a radial bearing whose surfaces are separated by a fluid. This type of bearing for supporting the tool in the adapter is only given by way of example and other types of bearings are conceivable, such as air bearings, magnetic bearings or roller bearings. The adapter may either be an integral part of the front end-shield 5 of the drive unit 2 or may be a separate part that is fastened to the end-shield. The adapter may be constructed so as to enable the tool carried thereby to be easily released and to be adapted with respect to tool changes. When the milling head or cutting blades of the tool (described hereinafter) is/are intended to cut deeply into a workpiece A, the supportive part 17 shall include in the vicinity of the milling head 24, and therewith also in the vicinity of the bearing surfaces 26 and 18, a part that has a radial extension which is smaller than half the cutting diameter D of the cutting edges of the milling tool. Thus, in distinction to FIG. 2, FIGS. 3 and 4 show that the supportive part 17 has in the proximity of the tool 24 and the bearing surfaces 26 and 18 a cross-sectional shape which includes a part whose radial extension is smaller than half the cutting diameter D of the tool 24 and a supporting part whose radial extension is greater than half the cutting diameter D. FIG. 4 shows the milling head 24 cutting to the desired depth in a workpiece A, this depth being permitted by the supportive part 17.

Tool

Figure 5:
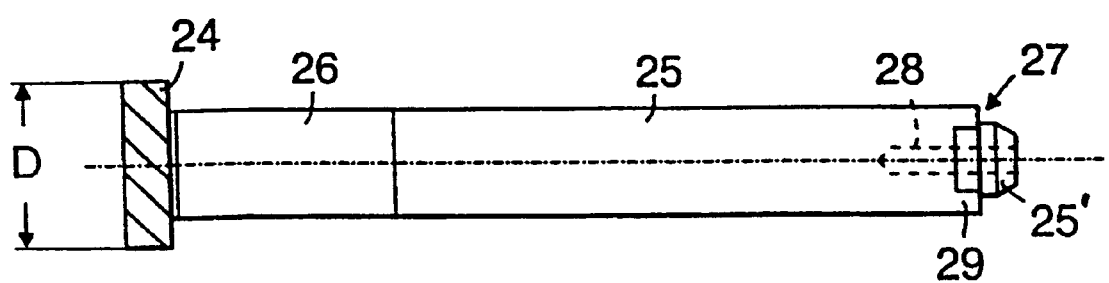
FIG. 5 is a schematic illustration of the inventive tool.

The inventive tool is illustrated more clearly in FIG. 5 and will be seen to comprise a milling tool having a milling head 24 provided typically with cutting edges, a shaft 25 and a fastener means 27. The shaft 25 is cylindrical and has a bearing surface 26 formed in the proximity of the milling head 24 that carries the cutting edges. The milling tool is preferably a single-piece hard-metal structure. The fastener means 27 has a conical guide surface 25' which functions to centre the tool in the spindle 4, said spindle having a recess corresponding to the conical guide surface 25'. The tool shaft 25 has a threaded bore 28 into which a corresponding threaded draw rod 4' can be screwed to affix the tool to the spindle 4 and to take-up axial pulling or tension forces acting on the tool. The fastener means 27 also includes a spanner grip 29 which, in coaction with a corresponding spanner grip on the spindle 4, mechanically transfers torque between the spindle 4 of the drive unit and the tool with its milling head 24.

It will be understood that there is created by virtue of the coaction between the radial bearings 18, 26 and the radial guide 25' between tool and drive-unit spindle 4 a moment of force that counteracts the moment of force occurring as a result of the tool overhang and the cutting forces acting on the tool.

Because of its construction and the manner in which it is supported in the adapter 1, the inventive milling tool with its bearing surface 26 coacting with the bearing 18 in the supportive sleeve 17 will withstand the radial cutting forces that occur at the speeds concerned in the present context. The axially acting cutting forces generated by the tool will, of course, be taken-up by the thrust bearings on the spindle 4 (8 and corresponding thrust bearings on the other end of the spindle 4) via axial-force transferring surfaces—the surface 25'—coacting with the spindle, and the screw threads on the tool—pull rod.

SUMMARY

By virtue of the present invention, a tool will be effectively carried or supported by the supportive part 17 as a result of the coaction of the bearing surfaces 18 and 26. Furthermore, because the bearing surfaces have been positioned as close as possible to the tool cutting-edges both bending forces and radially acting bearing forces will be minimized in relation to the radially acting cutting forces, thereby enabling a greater radially acting cutting force to be journalled at a higher speed than has hitherto been possible in the present context.

Because the radial extension of the adapter in at least one direction is less than half the cutting diameter of the tool, stiffening or bracing elements can be milled in the workpiece A to a depth which exceeds the axial thickness of the tool, FIG. 4.

By reading the pressure variations sensed in the bearing 18, 26 via the pressure sensors 23, it is possible to determine the bending loads and the directions in which they act on the tool shaft 25 and on the supportive part 17. It will be understood that a strain gauge may be mounted on the supportive part 17 to the same end.

It will also be understood that the invention can be applied with other types of tools, for instance spiral drills whose guide edges will therewith form counter-bearings to the bearing 18 on the supportive part 17.

In the case of certain applications of the invention, it may be suitable to provide an axially extending bearing or more than one bearing in the supportive part (and the tool shaft), said bearing conceivably being different to the illustrated and described kind. By the expression "a bearing surface" and "a bearing" as used with reference to the tool and to the adapter is meant the total bearing surface and the total bearing irrespective of whether said bearing surface or bearing are unitary or divided.

What is claimed is:

1. A high-speed milling and drilling tool having a cutting part in the form of a cutting head, and a fastener means provided on the end of the tool remote from the cutting head, wherein at least a part of the tool forms a bearing surface in close proximity of the cutting head for the bearing that takes-up radially acting cutting forces, the bearing is in the form of a bearing surface provided to cooperate with the bearing surface of the tool, the two surfaces are mutually separated by a fluid and essentially axially non slidable in relation to each other when the tool is engaging the workpiece.

2. A tool according to claim 1, wherein the fastener means includes a guide surface which centers the fastener means in relation to the spindle of a drive unit.

3. A tool according to claim 1, wherein the fastener means includes surfaces that transfer axially acting forces to the drive unit spindle.

4. A tool according to claim 1, wherein the diameter of the bearing surface of the tool is smaller than the cutting diameter of the cutting head.

5. A tool according to claim 1, wherein the fastener means includes a mechanically torque transmitting part that coacts with the drive unit used to rotate the tool.

6. A tool according to claim 1, wherein the bearing surface is a radial bearing.

7. The tool according to claim 1, wherein said fastener means includes a conical guide surface configured and arranged to center the fastener means in relation to a spindle of a drive unit.

8. The tool according to claim 1, wherein an axis of said fastener means is coincident with an axis of the tool.

9. The tool according to claim 1, wherein a shaft of the tool has a threaded bore at the end remote from said cutting head.

10. The tool according to claim 5, wherein said mechanically torque transmitting part comprises a spanner grip.

11. A tool for milling and drilling, said tool comprising:

a cutting part in the form of a cutting head;

a fastener provided on an end of the tool remote from said cutting head; and a bearing surface in close proximity of said cutting head and configured and arranged to transfer radially acting cutting forces to a bearing surface of a supportive bearing carried by a supporting part;

wherein said bearing surface is separated from the supportive bearing by a fluid, and wherein said bearing surface is essentially axially non slidable in relation to the supportive bearing.

12. The tool according to claim 11, wherein the fastener includes a guide surface configures and arranged to center the fastener in relation to the spindle of a drive unit.

13. The tool according to claim 11, wherein the fastener includes at least one surface that transfers axially acting forces to the drive unit spindle.

14. The tool according to claim 11, wherein a diameter of the bearing surface is smaller than a cutting diameter of the cutting head.

15. The tool according to claim 11, wherein the fastener includes a torque transmitting part configured and arranged to coact with a drive unit used to rotate the tool.

16. The tool according to claim 11, wherein the bearing surface is a radial bearing.

17. The tool according to claim 11, wherein said fastener includes a conical guide surface configured and arranged to center the fastener in relation to a spindle of a drive unit.

18. The tool according to claim 11, wherein an axis of said fastener is coincident with an axis of the tool.

19. The tool according to claim 11, wherein a shaft of the tool has a threaded bore at the end remote from said cutting head.

20. The tool according to claim 15, wherein said torque transmitting part comprises a spanner grip.

* * * * *

UNITED STATES PATENT AND TRADEMARK OFFICE
CERTIFICATE OF CORRECTION

PATENT NO.      : 6,318,937 B1                                      Page 1 of 1
DATED           : November 20, 2001
INVENTOR(S)     : Lind It is certified that error appears in the above-identified patent and that said Letters Patent is hereby corrected as shown below:

<u>Title page,</u>
Please change the following: [22] Please change "Filed: August 20, 1997" to -- PCT Filed: August 28, 1997 --.

Signed and Sealed this

Second Day of April, 2002

*Attest:*

*Attesting Officer*

JAMES E. ROGAN
*Director of the United States Patent and Trademark Office*